United States Patent
Scherer et al.

(10) Patent No.: US 6,293,494 B1
(45) Date of Patent: Sep. 25, 2001

(54) AIRCRAFT AIR INLET WITH AIRFLOW GUIDE TO PREVENT FLOW SEPARATION

(75) Inventors: Thomas Scherer, Hamburg; Uwe Buchholz, Bliedersdorf, both of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/431,474

(22) Filed: Nov. 1, 1999

(30) Foreign Application Priority Data

Oct. 30, 1998 (DE) ............................... 198 50 093

(51) Int. Cl.$^7$ .................................................. B64D 27/00
(52) U.S. Cl. .......................................................... 244/53 B
(58) Field of Search ........................... 244/53 B; 60/35.6; 137/15.1, 15.2; 440/38

(56) References Cited

U.S. PATENT DOCUMENTS

| 3,222,863 | 12/1965 | Klees et al. |
| 3,652,036 | 3/1972 | Sans et al. |
| 4,174,083 | 11/1979 | Mohn. |
| 4,775,341 | * 10/1988 | Tyler ................................... 440/38 |

FOREIGN PATENT DOCUMENTS 1139701    11/1962   (DE).

OTHER PUBLICATIONS

Barnes W. McCormick; Aerodynamics, Aeronautics, and Flight Mechanics; Jon Wiley and Sons, Inc.; p. 103.*
A thesis by Michael Klas (Matr. No. 041101, "Theoretische Untersuchung zur Erhöhung des Durchsatzes am Staulufkanal der Klimaanlage am Beispiel des Airbus A330 / A340" ("Theoretical Investigation for Increasing the Throughput at the Ram Air Channel of the Air Conditioning Plant in the Example of the Airbus A330 / A340"), Chapter 5, $5.2.6.2 "Vorprofil", p. 66, Thesis in the Fachhochschule of Aachen, Federal Republic of Germany, Aug. 1996).

* cited by examiner

Primary Examiner—Charles T. Jordan
Assistant Examiner—George L. Steele
(74) Attorney, Agent, or Firm—W. F. Fasse; W. G. Fasse

(57) ABSTRACT

An air inlet provides air to an air consuming system of an aircraft, such as an auxiliary power unit, which consumes ram air during flight and which sucks in ambient outside air during ground operations of the aircraft. The inlet opening is flush with the outer surface of the fuselage skin. An air channel extends from the opening and is recessed into the fuselage. An air inlet lip bounds the downstream edge of the inlet opening. To prevent the formation of an airflow separation bubble in the air channel when air is sucked into the inlet during ground operations of the aircraft, an air guide element is arranged adjacent to the nose of the air inlet lip. In one embodiment the air guide element is an aerodynamically profiled auxiliary slat fixed in front of the nose of the air inlet lip to form an air guide gap therebetween. In another embodiment, the air guide element is a tiltable air guide flap that can be selectively deployed to extend downwardly from the nose of the air inlet lip during ground operation, and retracted flush into a recess of the air inlet lip during cruise flight of the aircraft.

19 Claims, 3 Drawing Sheets

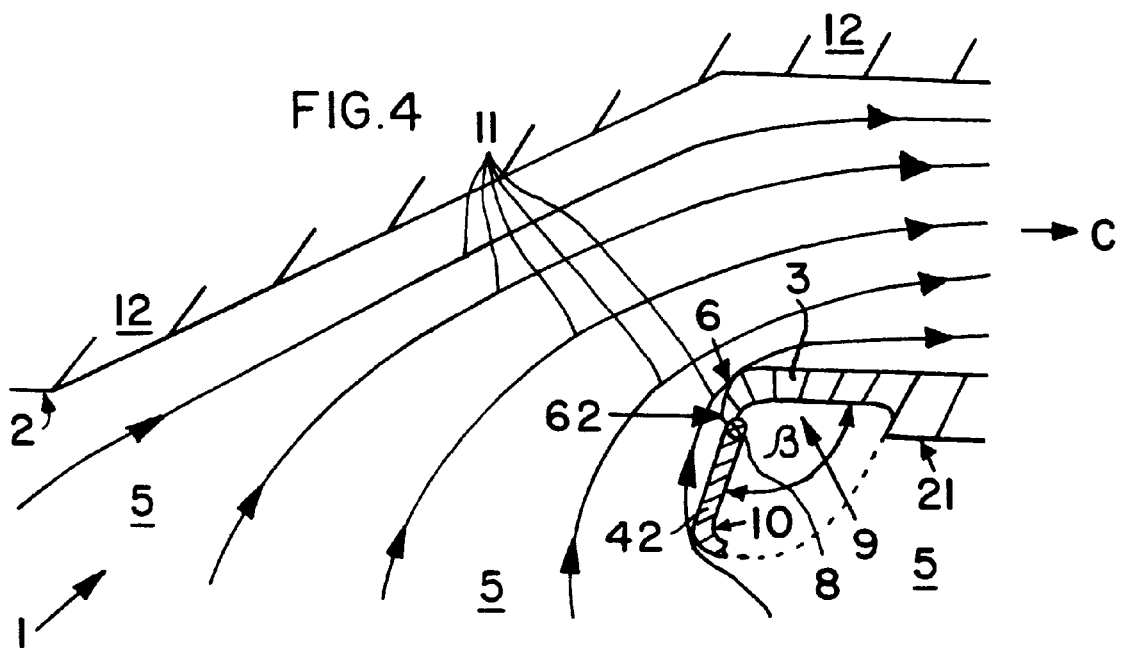

US 6,293,494 B1

AIRCRAFT AIR INLET WITH AIRFLOW GUIDE TO PREVENT FLOW SEPARATION

PRIORITY CLAIM

This application is based on and claims the priority under 35 U.S.C. §119 of German Patent Application 198 50 093.9, filed on Oct. 30, 1998, the entire disclosure of which is incorporated herein by reference.

FIELD OF THE INVENTION

The invention relates to an air inlet or intake for an aircraft that essentially comprises an intake or inlet opening that is recessed into the outer fuselage skin of an aircraft in the airflow lengthwise direction, so that the entire inlet cross-sectional area is flush with or recessed into the outer surface of the aircraft skin. The air inlet leads into an air channel that is connected to an air suction source, so that the air inlet provides outside air that is sucked from the exterior of the aircraft into the air suction source, such as an auxiliary power unit or the like. The downstream edge of the air inlet, with reference to the airflow direction during flight of the aircraft, is bounded by an air inlet lip that extends flush with and forms an extension of the outer surface of the fuselage skin. The air inlet is suitable to be used for connection with all systems of an aircraft that demand a flow of external air, whereby the air inlet is to provide an optimal utilization and recovery of pressure and a minimum interference drag or resistance, both during flight and during ground operations of the aircraft.

BACKGROUND INFORMATION

Various air inlet systems and particularly ram air inlets are known in the field of aircraft construction. These air inlet systems include recessed or recessible air channel inlets that are arranged on various aerodynamic surface areas of the aircraft. These inlets serve to deflect at least a portion of the boundary layer airflow from the exterior of the aircraft during flight thereof, so that the boundary layer air can flow into the interior of the aircraft in a suitable airflow channel, to be used by any one of a number of different systems of the aircraft.

Also, a so-called NACA sink inlet or intake developed by the National Advisory Committee for Aeronautics (NACA) is also known in the art, and is often used in aircraft for various air suctioning systems. Examples of such systems installed in aircraft include the auxiliary power unit (APU) intakes, air conditioning pack ram channel inlets, belly fairing ventilation inlets, and the like. These NACA sink inlets installed typically in aircraft primarily serve to provide exterior air to smaller power plants or auxiliary devices, for example in the form of ram air inlets for providing cool air to the air conditioning packs. Such a NACA sink inlet is also conventionally arranged in the belly fairing of the aircraft of the Airbus family for providing external air for cooling the bleed air extracted from the jet engines in corresponding heat exchangers of the air conditioning systems. In order to provide air to the auxiliary power unit (APU), a NACA sink inlet having parallel side walls is installed in the bottom surface or belly of the fuselage in the area of the horizontal tail surfaces of the aircraft. Additionally, a so-called pack bay ventilation inlet is provided to ventilate the air conditioning pack bay and also for tempering the aircraft structure. This pack bay ventilation inlet is typically arranged in the forward portion of the belly fairing. Moreover, two sink inlets are typically provided on the cowling of an engine, whereby one of the inlets serves to provide cooling air for carrying out the first stage cooling of the bleed air extracted from the engine, and the second inlet provides air for ventilating the intermediate space between the engine and the cowling. Another use or arrangement of such an air inlet is as a wing tank inlet, for providing air for ventilating the fuel tanks and thereby achieving a pressure equalization. In this context, the wing tank inlet is arranged on the bottom exterior surface of the respective wing.

All of the above described different air inlets have an inlet geometry, especially including inlet edges or an inlet lip against which the relative wind flows as the aircraft is in flight, such that this inlet geometry generates a pair of air vortices which transport the energy-rich air of the boundary layer into the inlet. In this manner, during flight of the aircraft, a useable pressure recovery is achieved for the air guide channel system arranged downstream of the air inlet, which serves to provide an air mass flow transport. The amount of turbo-machine or turbine engine suction power that would otherwise be necessary can be considerably reduced or completely eliminated through the use of such air inlets. Namely, the necessary aerodynamic energy of the air supply for the above mentioned auxiliary aggregates or systems of the aircraft is solely provided by the motion of the aircraft through the surrounding air during cruise flight of the aircraft, or more accurately is provided by the aerodynamic flow of the surrounding air relative to the air inlet edges or lips of the NACA sink inlets. However, when the aircraft is operating on the ground, either parked, taxiing or rolling for take-off or landing, this aerodynamic flow of the surrounding air is completely non-existent or is insignificant and therefore does not provide the above described effects. During this period of time of ground operations, the required volume flow of external air is sucked through the respective air inlet such as a NACA sink inlet, for supplying the respective auxiliary system of the aircraft.

Present FIG. 1 shows the airflow situation in connection with a NACA air inlet 1' for the situation when the aircraft A' is flying forward in cruise flight. As shown in FIG. 1, the flow of outside air 5' flows smoothly from left to right, whereby a portion 53' of the outside air is sucked smoothly into the air inlet 1'. The nose portion 6' of the inlet lip 3' faces directly into the incident flow, whereby the airflow is divided into a portion 53' that flows into the air inlet 1' and a portion 54' that continues to flow along the exterior of the aerodynamic surface of the aircraft fuselage.

In comparison to the above described flow condition that exists during forward flight of the aircraft, a completely different flow pattern exists around the air inlet 1' during the ground operations of the aircraft. Such a flow condition and situation is illustrated in present FIG. 1A. In this condition, there is no longer a general flow of the relative wind from left to right along the outer aerodynamic surface of the aircraft. Instead, the outside air 5' is substantially stagnant and is sucked from all directions, i.e. from the left and from the right and from all directions underneath the aircraft, into the air inlet 1' by the suction that prevails in the air guide channel C' connected downstream of the air inlet 1'. As a result, outside air 5' being sucked from the right in FIG. 1A fully flows around the 180° curved or rounded surface of the nose portion 6' of the inlet lip 3' of the air inlet 1'. Largely due to the 180° curve of the airflow pattern of the outside air 5' flowing directly over the nose portion 6' of the inlet lip 3', a flow separation bubble B' is formed directly downstream from the upper nose edge 61' of the nose portion 6' within the air guide channel C'. This separation bubble B' extends into or is sucked into the air intake system connected to the downstream end of the air guide channel C'. This leads to high inlet losses, which in turn reduce the theoretically obtainable air flow and air power that would be achieved without such inlet losses.

A thesis by Michael Klas (Matr. No. 041101, "Theoretische Untersuchung zur Erhöhung des Durchsatzes am Staulufkanal der Klimaanlage am Beispiel des Airbus A330/A340" ("Theoretical Investigation for Increasing the Throughput at the Ram Air Channel of the Air Conditioning Plant in the Example of the Airbus A330/A340"), Chapter 5, §5.2.6.2 "Vorprofil", page 66, Thesis in the Fachhochschule of Aachen, Federal Republic of Germany, August 1996), suggests that the arrangement of a wing-like aerodynamic profile member on the surface of the aircraft in front of the NACA sink inlet will influence flow lines of the air flowing past this aerodynamic profile member. The deflection of flow lines downstream from this profile member makes it possible for the upper energy-rich boundary layer air to flow into the channel inlet. In this manner, in addition to the slight resistance increase caused by the profile member, there should also arise an increase in the ram air pressure recovery ratio. To achieve this, Klas further explains that a particular conclusion regarding the magnitude of the curvature and the advantageous spacing of the profile member relative to the intake for achieving an effective deflection of the external airflow can once again only be determined by means of a wind tunnel study or a computer simulation.

These remarks of Klas are illustrated by FIG. 5.11 which shows the construction of the described air inlet, with an inlet lip against which the incident air flows, a channel inlet that is recessed along its length, and a leading edge profile member that is rigidly arranged in front of or upstream of the sink inlet. FIG. 5.11 of this thesis reference further shows the airflow line pattern of the boundary layer air. In this manner, the thesis suggests a possibility for improving the inlet flow behavior of the free external airflow of the boundary layer into the NACA sink inlet during the cruise flight of an aircraft. However, this thesis reference does not mention or suggest anything about the different flow pattern that exists in the area of the air inlet, and the resulting disadvantageous separation bubble and the like, when an aircraft is parked or operating at low speeds on the ground rather than in cruise flight. The problems associated with the air inlet airflow pattern during ground operation of the aircraft were apparently not recognized, and in any event were not treated, nor were any motivations given in this regard.

U.S. Pat. No. 4,174,083 discloses a conceptual solution for the problem of influencing the airflow as carried out by the Boeing Corporation. According to this reference, a delta-shaped wing with a special tilt angle is moved or projected into the external airflow over the inlet region of an above-described NACA inlet. This delta-shaped wing effectuates a variation of the airflow outside of the inlet, in connection with a maximum opening of the inlet flap. Due to the wing form that is tipped or tilted toward the inlet, the energy-rich free external airflow is deflected toward the rear portion of the inlet. The pair of vortices arising on the wing edges is similarly sucked into the channel inlet so that no additional resistance arises due to the vortices. However, in this prior art arrangement, a very wide open flap setting of the intake flap is required before a pressure increase is achieved due to the deflected airflow entering into the channel inlet. When the flap is closed or even when the flap is partially open over a large opening range, the deflected air will not enter into the channel of the sink inlet. As a result, the pair of vortices will cause increased resistance values due to the vortex formation. Moreover, no details have been disclosed regarding the ram air pressure recovery ratio and the resistance increase values for this single configuration of the arrangement, so that further wind tunnel tests and the like would be necessary to determine the efficiency of such an airflow influencing measure.

Various other measures for influencing the airflow at or near the inlet lip of engine air inlets are known in the art, for example from U.S. Pat. No. 3,652,036 especially in connection with FIGS. 1 to 5 and the associated description thereof, German Patent Laying-Out Publication 1,139,701, especially in connection with FIGS. 1 and 2 and the associated description thereof, and U.S. Pat. No. 3,222,863, especially in connection with FIGS. 1 to 4 and the associated description thereof. However, there are no suggestions or motivations as to whether such inlet lip configurations or auxiliary measures can also be used advantageously in connection with the inlet lip of a NACA inlet.

SUMMARY OF THE INVENTION

In view of the above it is an object of the invention to provide an aircraft air inlet of the above described general type, which is configured and arranged in such a manner so as to prevent the formation of an airflow separation bubble of the outside air being sucked into the sink inlet. The invention further aims to avoid or overcome the disadvantages of the prior art, and to achieve additional advantages, as apparent from the present description.

The above objects have been achieved in an air inlet arrangement for an aircraft, according to the invention, wherein the air inlet has an air inlet opening that is flush with the outside aerodynamic surface of an aircraft, and an inlet channel recessed into the aircraft extending downstream from the inlet opening. An inlet lip bounds the downstream edge of the inlet opening, with reference to the airflow direction when the aircraft is in forward flight. The outer surface of the inlet lip is incorporated as a part of, or extends flushly with respect to, the outer aerodynamic surface of the aircraft fuselage skin.

Especially according to the invention, an aerodynamic air guide element is secured to the inlet lip, and acts to influence the airflow behavior of the outside air being sucked into the air inlet when the aircraft is parked or operating on the ground. In one embodiment, the air guide element comprises an aerodynamically shaped auxiliary leading edge slat arranged spaced in front of the nose of the air inlet lip so as to form an air guide gap between the auxiliary slat and the nose of the inlet lip. Alternatively, the air guide element comprises an air guide flap that can be selectively tilted to extend down from the nose of the inlet lip or tilted up to be recessed flush with the bottom surface of the inlet lip. In either case, the air guide element redirects the airflow pattern flowing directly over the nose portion of the air inlet lip so as to prevent the formation of an airflow separation bubble inside the air inlet channel just downstream from the nose of the air inlet lip.

BRIEF DESCRIPTION OF THE DRAWINGS

In order that the invention may be clearly understood it will now be described in connection with example embodiments, with reference to the accompanying drawings, wherein:

FIG. 4 is a schematic sectional view of an air inlet according to a second embodiment of the invention, with an air guide flap tiltably connected to the nose of the air inlet lip, and shows the airflow pattern of outside air being sucked into the air inlet during ground operation of the aircraft.

DETAILED DESCRIPTION OF PREFERRED EXAMPLE EMBODIMENTS AND OF THE BEST MODE OF THE INVENTION

Figure 1:
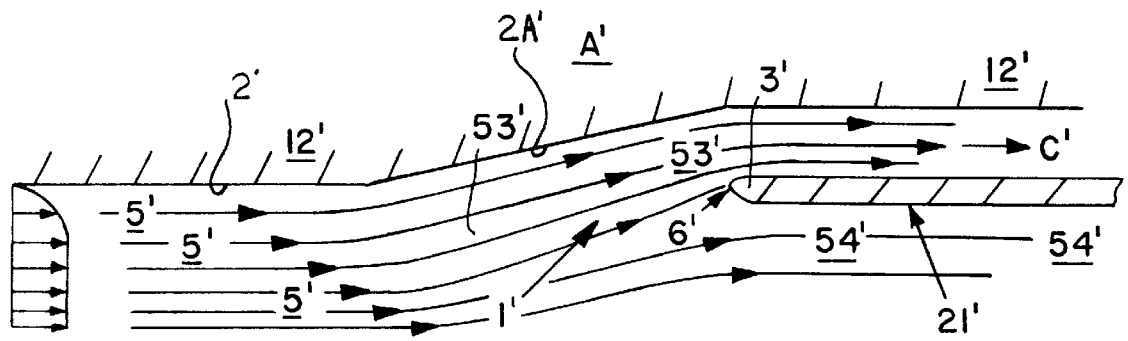
FIG. 1 is a schematic sectional view of a conventional air inlet of an aircraft, illustrating the airflow pattern of the boundary layer air or ram air entering into the air inlet when the aircraft is in forward cruise flight.
Figure 1A:
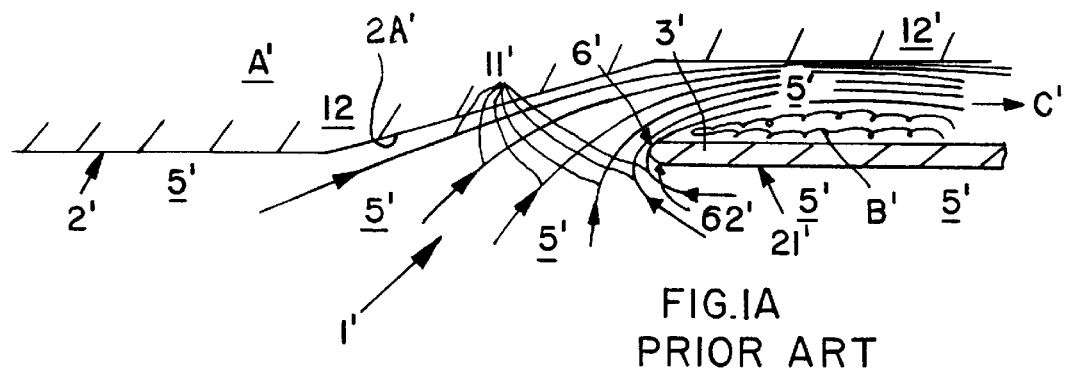
FIG. 1A is a schematic view illustrating the same air inlet of FIG. 1, but shows the airflow pattern of outside air being sucked into the air inlet during ground operations of the aircraft.

FIG. 1 and FIG. 1A show a conventional air inlet 1' such as a NACA sink inlet 1', which is recessed into an aerodynamic surface 2' of an aircraft structure or air frame 12' of an aircraft A. Outside air 5' flows along the aerodynamic surface 2', which is generally the exterior fuselage skin of the aircraft. Such a conventional air inlet 1' is, for example, used in the Airbus A340 aircraft. The opening cross-sectional area of the NACA sink inlet 1' is flush with or fully recessed into the outer contour of the aerodynamic surface 2', so that such a flush or recessed inlet 1' has a different aerodynamic function or manner of operation in comparison to partially recessed or externally protruding air intake systems.

The air inlet 1' is connected to or is the opening mouth of an air guide channel C', whereby cool outside air 5' is deflected through the inlet 1' into the air guide channel C' to be delivered to various auxiliary systems inside the aircraft. Specifically, a portion of the local boundary layer of the outside air 5' is deflected and diverted into the air inlet 1'. The structure and configuration of the overall air intake is largely determined by the inlet geometry of the channel inlet 1' itself, which is lengthwise recessed into the aerodynamic surface 2' of the aircraft structure 12'. The downstream side or edge of the opening of the inlet 1', with reference to the airflow direction when the aircraft is in forward cruise flight as shown in FIG. 1, is bounded by a so-called inlet lip 3'. On the other hand, the flight-forward side of the air inlet 1' is bounded by a sloping wall 2A' of the fuselage outer skin that leads and transitions into the air guide channel C'. The sides of the air inlet 1', which extend substantially parallel to the lengthwise aircraft axis and are not visible in FIG. 1, are similarly bounded by recessed wall portions of the aircraft fuselage skin.

The above mentioned inlet lip 3' is a generally plate-shaped body that extends from the aircraft structure or air frame 12' in a forward direction and thereby separates the air guide channel C' from the exterior. Namely, the air inlet lip 3' forms a part of the aerodynamic exterior surface 2' of the outside skin of the aircraft in this area. Particularly, the outer aerodynamic surface 21' of the air inlet lip 3' forms a flush extension of the outer aerodynamic surface 2' of the aircraft A'. The forward-facing free edge or rim of the air inlet lip 3' is configured as a 180°-curved nose portion 6' that extends substantially perpendicularly relative to the forward flight direction, i.e. the direction defined parallel to the fuselage axis.

This leading edge or nose portion 6' of the lip 3' is directly exposed to the incident airflow, i.e. the relative wind, with a ram effect, when the aircraft is in forward cruise flight as shown in FIG. 1. Thus, a portion 53' of the exterior boundary layer airflow 5' is directed into the air inlet 1' and thus downstream into the air guide channel C', while another portion 54' of the outside airflow 5' continues to flow smoothly along the outer aerodynamic surface 21' of the air inlet lip 3'. The nose portion 6' of the air inlet lip 3' forms the dividing point between the airflow portion 53' directed into the air guide channel C' and the airflow portion 54' that continues to flow along the outside surface of the aircraft. In this flow condition, i.e. when the aircraft is in forward cruise flight, the ram air effect predominates in the inlet 1' and the air guide channel C', i.e. there is no suction applied from the downstream end of the air guide channel C'.

It should be understood that the flow patterns illustrated in FIG. 1, and in the following Figs. as discussed below, are simplified flow patterns that omit the more complex aerodynamic flow processes that take place in the respective flow situations within the interior of the air guide channel and on the various inner and outer surfaces of the aircraft, including the outer surface 21' of the lip 3', the outer surface 2' of the aircraft fuselage, and the inner surfaces such as the sloping surface 2A', as well as along the inner surface and the nose surfaces of the inlet lip 3'. The discussion is also simplified to focus attention on the advantageous influences of the inventive arrangement without addressing the detailed aerodynamic considerations. Such simplification is acceptable and does not detract from the aspects of the invention, because the construction of the inlet lip 3' or 3 is determinative for the airflow along the inner and outer surfaces of the lip, and also within the air guide channel adjoining the lip. Thus, the configuration or arrangement of the inlet lip 3' or 3 and its associated auxiliary components according to the invention determines the subsequent airflow behavior in the air guide channel and also along the downstream exterior aerodynamic surfaces of the aircraft. For example, the curvature and the nose radius of the inlet lip 3' and 3 are determinative for the airflow patterns of the air flowing over the nose portion of the lip.

The above considerations are important because the configuration of the lip 3' and particularly the nose portion 6' as optimized for the optimal airflow pattern when the aircraft is in forward cruise flight as shown in FIG. 1, are conventionally not optimal for the airflow pattern when the aircraft is in ground operations as shown in FIG. 1A. Namely, when there is only minimal or no relative wind and thus no ram air effect, i.e. when the aircraft is operating or parked on the ground, the suction of the air-consuming system of the aircraft will suck in the outside air 5' through the air inlet 1' as shown in FIG. 1A. Due to this suction, the outside air 5' will be substantially uniformly sucked from all directions, namely from the left, from the right, and from below the air inlet 1' as shown in FIG. 1A. Thereby, air that flows directly over the nose portion 6' of the air inlet lip 3' is sucked from the right as shown in FIG. 1A and caused to make a sharp turn around the nose portion 6' of the lip 3'.

As a result, a return flow or eddy area is formed directly downstream of the upper edge 61' of the nose portion 6' of the inlet lip 3', which results in the formation of an airflow separation bubble B'. This separation bubble B' then extends or proceeds into the air guide channel C' and can even be sucked entirely into the air consuming system. This substantially increases the overall airflow losses and resistance of the air intake flow sucked through the inlet 1'. The above described pattern of the airflow lines 11' entering the air inlet 1' is clearly illustrated in FIG. 1A.

In this context, the particular aerodynamic details of the formation of the airflow separation bubble are dependent on various factors, such as the curvature shape of the nose portion 6' of the air inlet 3', the entry angle of the airflow into the air guide channel C' depending on the curvature or angle of the upper edge 61' of the nose portion 6', the airflow direction, the airflow velocity, etc.

Figure 2:
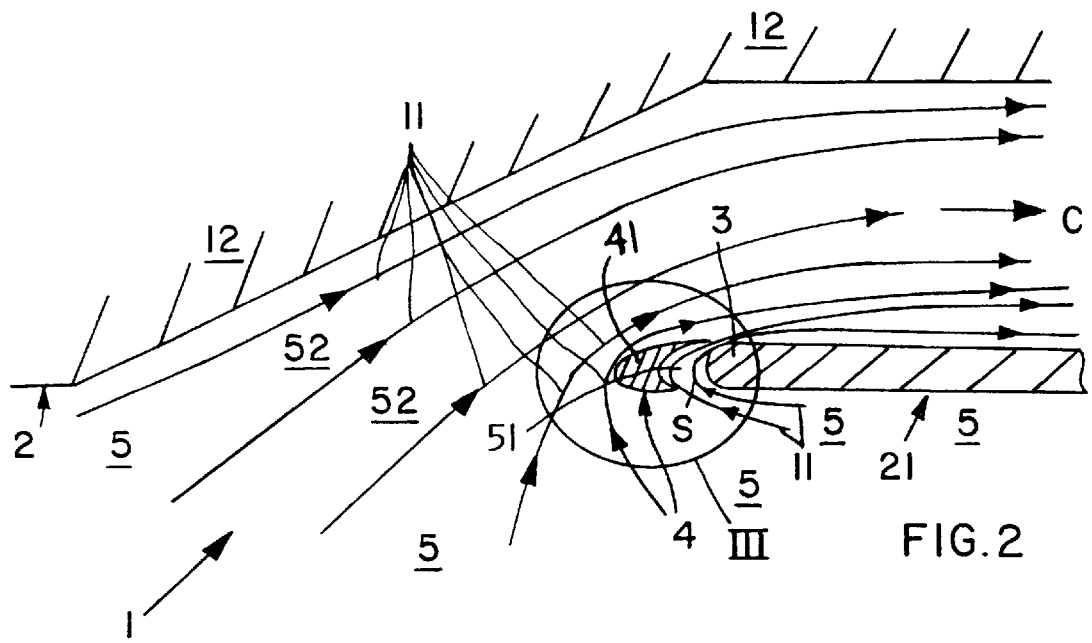
FIG. 2 is a schematic sectional view of an air inlet of a first embodiment according to the invention, including an auxiliary guide slat arranged in front of the nose of the inlet lip, and shows the airflow pattern of outside air sucked into the air inlet during ground operations of the aircraft.
Figure 3:
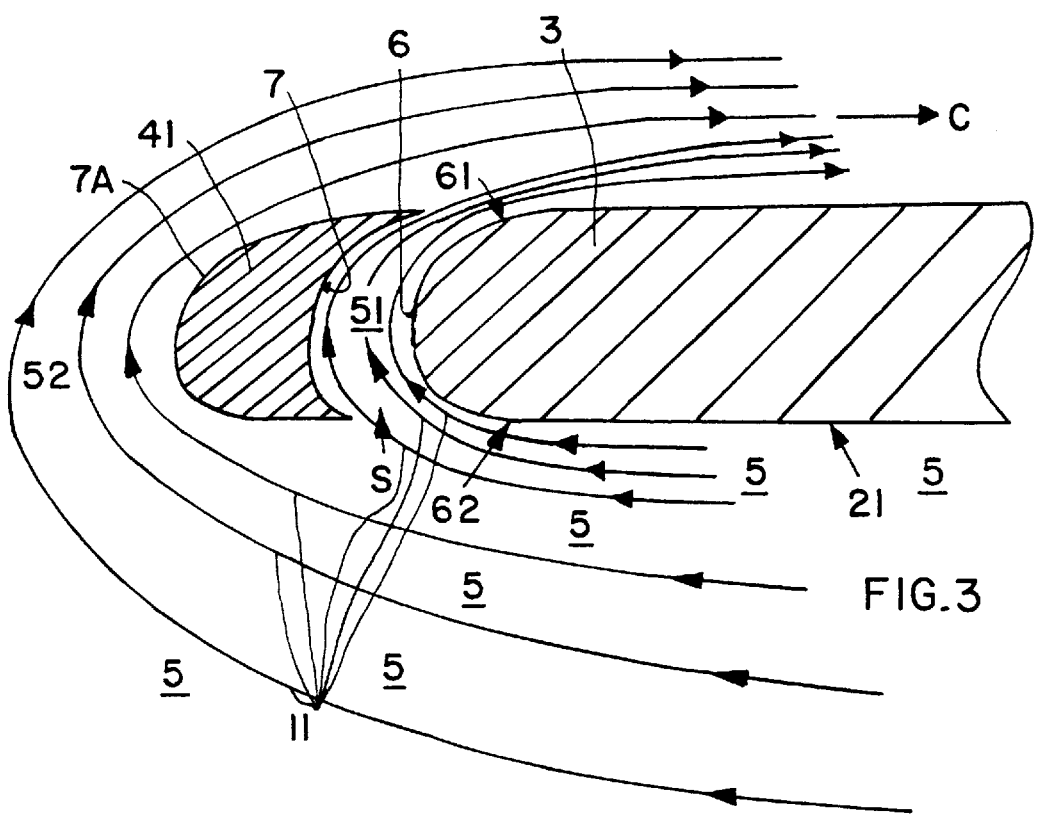
FIG. 3 is an enlarged detail sectional view of the detail area III shown in FIG. 2.

The invention avoids the above described disadvantageous airflow behavior that leads to the formation of a separation bubble in the sucked-in outside air 5 within the air guide channel C downstream of the air inlet 1, as shown and described in connection with FIGS. 2 to 4. Particularly, FIGS. 2 to 4 show air inlets 1 according to the invention, that generally correspond to the conventional air inlet 1' that has been discussed above in connection with FIGS. 1 and 1A. The corresponding components of the inventive embodiments in FIGS. 2 to 4 are labeled with reference numbers corresponding to those in FIGS. 1 and 1A except without the prime mark.

Starting from the conventional arrangement as discussed above, the inventive embodiments further comprise an aerodynamic air guide element 4 that is arranged slightly in front of and/or below the nose portion 6 of the inlet lip 3. This air guide element 4 influences the airflow of outside air 5 being sucked into the air inlet 1, particularly in the flow region along the nose portion 6 of the inlet lip 3, so as to avoid the formation of the above discussed separation bubble B' within the air guide channel C just downstream from the inlet 1.

FIGS. 2 and 3 show a first embodiment in which the above mentioned air guide element 4 is embodied more particularly as an auxiliary leading edge air guide slat 41 arranged directly in front of the nose portion 6 of the inlet lip 3, with a small airflow gap s therebetween. This auxiliary slat 41 is configured as an aerodynamic guide vane, for example having the configuration of a typical slat used on the leading edge of an aircraft lifting wing. The airflow gap s is formed between the forward facing nose portion 6 of the air inlet lip 3 and the rearward facing or back surface 7 of the auxiliary slat 41. The two surfaces bounding the gap s have substantially the same curvature, or slightly different curvatures to form a nozzle effect in the gap s which accelerates and deflects the airflow through the gap s, and thereby directs the airflow through this gap s into the air guide channel C in such a manner, direction and location so as to avoid the formation of the above described separation bubble B'.

More particularly, while a major portion 52 of the outside air 5 flows into the main opening of the air inlet 1, a smaller portion 51 of the outside air 5 is sucked through the gap s between the auxiliary slat 41 and the nose 6 of the air inlet lip 3. The airflow portion 51 that is thereby accelerated and deflected through the gap s is directed into the air guide channel C at an entry angle that is significantly smaller than the entry angle that would be achieved without the auxiliary slat 41, i.e. according to the conventional arrangement shown in FIG. 1A. Namely, the entry angle defined between the top surface of the lip 3 bounding the air guide channel C and the airflow lines entering the air guide channel C around the nose 6 of the lip 3 is smaller in the inventive embodiment according to FIG. 3 in comparison to the conventional embodiment shown in FIG. 1A. This reduced entry angle in combination with the accelerated flow behavior of the airflow portion 51 entering the air guide channel C at a location that would otherwise be subject to the formation of a separation bubble B', thereby prevents the formation of such a separation bubble B'.

Also, the major airflow portion 52 entering the air inlet 1 has a flow pattern that is affected by the aerodynamically curved shape of the front surface 7A of the auxiliary slat 41. The two airflow portions 52 and 51 that are influenced in the above manner by the auxiliary slat 41 are rejoined and combined in the air guide channel C just downstream of the gap s and thereby flow together through the air guide channel C to the air consuming system, while preventing the formation of a separation bubble B'.

FIG. 3 is an enlarged view of a detail portion III of FIG. 2, and particularly illustrates the airflow pattern that has been discussed above, as influenced by the arrangement and configuration of the auxiliary slat 41. It is especially apparent in FIG. 3 that the rear surface 7 of the auxiliary slat 41 can be shaped as needed to cooperate with the forward nose surface 6 of the inlet lip 3 in order to accelerate and deflect the airflow portion 51 in the required manner into the air guide channel C so as to prevent the formation of a separation bubble. Particularly, the rear surface 7 of the auxiliary slat 41 has a sharp curvature and defines a narrowing or tapering cross-sectional width of the gap s so as to form a slot nozzle effect that accelerates and deflects the airflow portion 51 nearly flush along the upper surface of the air inlet lip 3 over the upper edge 61 of the nose 6 of the lip 3.

By accelerating and deflecting the airflow portion 51 to an area directly along the upper surface of the air inlet lip 3, and thereby preventing the formation of a separation bubble, the entire cross-sectional vertical height of the air guide channel C as shown in FIG. 2 becomes useable for conveying the suction airflow. As a result, the air inlet losses are reduced and higher system output can be achieved. The auxiliary slat 41 is aerodynamically configured as required for any particularly application so that the pressure recovery and the interference resistance exhibited by the air intake 1 is not negatively influenced by the presence of the auxiliary slat 41 during forward cruise flight of the aircraft. As can be understood in connection with the airflow pattern shown in FIG. 1, the arrangement of the auxiliary slat 41 directly in front of or upstream of the nose 6 of the lip 3 has essentially no effect in the forward flight mode, and the nose or leading edge of the auxiliary slat 41 simply takes the place of or acts as the nose 6 of the lip 3. While not expressly shown in the drawings, spacer mounting struts or webs may extend between the auxiliary slat 41 and the nose 6 of the lip 3, so as to rigidly or pivotally connect the slat 41 to the lip 3.

FIG. 4 shows a second embodiment of the invention, for preventing the disadvantageous formation of the separation bubble when sucking outside air 5 into the air inlet 1 during ground operations of the aircraft. Specifically, in the embodiment of FIG. 4, the generalized air guide element 4 is embodied as an air guide flap 42 that includes a substantially planar flap body which is tiltably secured along one long edge thereof, by a hinge joint 8, to the lower edge 62 of the nose portion 6 of the inlet lip 3 of the air inlet 1. Such an air guide flap 42 has a configuration and function similar to that of a Kruger flap used on the lifting wings of aircraft.

In the present embodiment, the air guide flap 42 is selectively deployable by tilting through a tilt angle β about the hinge joint 8. Since the aerodynamic effects of the air guide flap 42 are only needed during ground operations of the aircraft, the air guide flap 42 is deployed to extend substantially perpendicularly downward from the nose 6 of the lip 3 during such operations. On the other hand, the aerodynamic effects of the air guide flap 42 are not needed during cruise flight of the aircraft, so that the air guide flap 42 is preferably retracted to lie flush with the outer surface 21 of the lip 3 under such conditions. In order to enable the complete flush retraction of the air guide flap 42, a recess 9 is provided in the bottom of the air inlet lip 3 in an area extending rearwardly from the nose portion 6 of the lip. The recess 9 has dimensions so as to completely receive the air guide flap 42 therein, with an outer surface of the flap 42 extending flush with the outer surface 21 of the remainder of the lip 3. Thus, the angle β for the fully deployed air guide flap 42 is about 90°, for example in the range of 80° to 110°. The air guide flap 42, in addition to the planar or plate-like main body thereof, has a curved free edge portion 10 that curves back toward the downstream main body portion of the air inlet lip 3. This curved free edge portion 10 advantageously influences the airflow behavior of air being sucked around the air guide flap 42 into the air inlet 1.

When the air guide flap 42 is tilted downward about the hinge joint 8 and fully deployed as shown in FIG. 4, it deflects or redirects the airflow of outside air 5 being sucked over the nose portion 6 of the inlet lip 3 into the air inlet 1. By forcing the air that flows directly over the nose portion 6 of the lip 3 to be sucked around the curved free edge portion 10 and then along the extending body of the air guide flap 42, this airflow does not follow a tight curvature directly around the nose 6 of the lip 3 as in the prior art shown in FIG. 1A. Instead, the airflow passing over the upper edge 61 of the nose 6 follows a flow line with a smaller entry angle relative to the upper surface of the lip 3 into the air guide channel C. As a result, the formation of a separation bubble B' is avoided.

On the other hand, when the aircraft is in forward cruise flight, the air guide flap 42 is held in a retracted position recessed flushly into the recess 9. While this condition of the arrangement of FIG. 4 is not shown, it will be understood that the resulting airflow pattern corresponds to that shown in FIG. 1, and there is no aerodynamic penalty associated with the provision of the air guide flap 42 because it has been retracted completely flush into the recess 9.

Although the invention has been described with reference to specific example embodiments, it will be appreciated that it is intended to cover all modifications and equivalents within the scope of the appended claims. The present disclosure includes all possible combinations of any individual features recited in any of the appended claims. All references to forward, rear, downstream, and upstream, or the like, are relative to the normal forward flight direction of the aircraft.

What is claimed is:

1. In an aircraft including a fuselage, an air suction source that sucks outside air from an atmosphere outside of said aircraft when said aircraft is operating on the ground, and an air inlet having an inlet opening that is flush with or recessed into an outer surface of said fuselage, an air channel that extends and communicates from said inlet opening to said air suction source, and an inlet lip that extends from said fuselage to a free protruding nose of said inlet lip, wherein said nose bounds one side of said inlet opening, an improvement in said air inlet comprising an air guide element that has an aerodynamic contour and that is arranged adjacent to said nose of said inlet lip so as to influence a flow pattern of said outside air that is sucked into said air inlet when said aircraft is operating on the ground, wherein said air guide element comprises an element selected from the group consisting of a leading edge auxiliary slat arranged adjacent said nose of said inlet lip with a gap therebetween and a flap of which a majority portion is a flat planar flap body that extends from said nose of said inlet lip.

2. The improvement in said air inlet according to claim 1, wherein an outer surface of said inlet lip is a flush extension of said outer surface of said fuselage, an inner surface of said inlet lip extends along and bounds said air channel, and said one side of said inlet opening bounded by said nose is a rear side of said opening relative to a forward direction of flight of said aircraft.

3. The improvement in said air inlet according to claim 1, wherein said air guide element is configured and arranged so as to deflect at least a portion of said outside air into said air channel along a flow path that is more nearly parallel to and flushly along an inner surface of said inlet lip bounding said air channel.

4. The improvement in said air inlet according to claim 1, wherein said air guide element comprises means for deflecting at least a portion of said outside air that is sucked into said air inlet, along an airflow path that is more nearly parallel to an inner surface of said inlet lip that bounds said air channel and that extends downstream with respect to said airflow path from said nose of said inlet lip.

5. The improvement in said air inlet according to claim 1, wherein said air guide element comprises said leading edge auxiliary slat arranged at a spacing in front of said nose of said inlet lip so as to form said gap as an air guide gap between said nose and a guide surface of said auxiliary slat that faces said nose across said air guide gap, wherein said air guide gap is adapted to have a first partial airflow of said outside air sucked therethrough into said air channel.

6. The improvement in said air inlet according to claim 5, wherein said guide surface of said auxiliary slat and said nose of said inlet lip are respectively aerodynamically contoured so that said air guide gap is configured as a slot nozzle that is adapted to deflect and accelerate said first partial airflow therethrough.

7. The improvement in said air inlet according to claim 5, further comprising mounting webs extending between said guide surface of said auxiliary slat and said nose of said inlet lip so as to rigidly connect said auxiliary slat to said inlet lip.

8. The improvement in said air inlet according to claim 7, wherein said mounting webs rigidly connect said auxiliary slat to said inlet lip at an upper edge of said inlet lip within an entrance into said air channel.

9. The improvement in said air inlet according to claim 5, wherein said auxiliary slat is tiltably connected to said inlet lip so that said auxiliary slat can be selectively tiltably deployed and retracted.

10. The improvement in said air inlet according to claim 1, wherein said air guide element comprises said flap which is an air guide flap including said flat planar flap body of which one edge is tiltably connected to a lower edge of said nose of said inlet lip, wherein said air guide flap is selectively tiltable relative to said inlet lip into a deployed position in which said flap body protrudes substantially perpendicularly from said inlet lip and into a retracted position in which said flap body extends from said nose substantially parallel along said inlet lip in a downstream direction.

11. The improvement in said air inlet according to claim 10, wherein said inlet lip has a recess therein extending from said nose for a limited distance along said inlet lip, and wherein said recess is arranged and adapted to receive said air guide flap therein when said air guide flap is in said retracted position, with an outer surface of said air guide flap flush with an outer aerodynamic surface of said inlet lip.

12. The improvement in said air inlet according to claim 10, wherein said air guide flap further includes a curved edge portion that extends along an edge of said flap body opposite said one edge thereof that is tiltably connected to said lower edge of said nose, and wherein said curved edge portion curves away from said flap body in a direction toward said inlet lip.

13. The improvement in said air inlet according to claim 1, wherein said gap is an air gap that is always formed between said air guide element and said nose of said inlet lip.

14. In an aircraft including a fuselage, an air suction source that sucks outside air from an atmosphere outside of said aircraft when said aircraft is operating on the ground, and an air inlet having an inlet opening that is flush with or recessed into an outer surface of said fuselage, an air channel that extends and communicates from said inlet opening to said air suction source, and an inlet lip that extends from said fuselage to a free protruding nose of said inlet lip, wherein said nose bounds one side of said inlet opening, an improvement in said air inlet comprising an air guide element that has an aerodynamic contour and that is arranged adjacent to said nose of said inlet lip so as to influence a flow pattern of said outside air that is sucked into said air inlet when said aircraft is operating on the ground, wherein said nose of said inlet lip has a convexly curved forward-facing surface, said air guide element has a concavely curved rearward-facing surface that is spaced apart from and faces said convexly curved forward-facing surface of said nose of said inlet lip, and an air gap having an arcuate cross-sectional shape is formed and bounded between said convexly curved forward-facing surface and said concavely curved rearward-facing surface.

15. The improvement in said air inlet according to claim 14, wherein said arcuate cross-sectional shape of said air gap curves rearwardly relative to a forward direction of flight of said aircraft both on a first side of said air gap that opens into said air channel and on a second side of said air gap that opens to said atmosphere outside of said aircraft.

16. In an aircraft including a fuselage, an air suction source that sucks outside air from an atmosphere outside of said aircraft when said aircraft is operating on the ground, and an air inlet having an inlet opening that is flush with or recessed into an outer surface of said fuselage, an air channel that extends and communicates from said inlet opening to said air suction source, and an inlet lip that extends from said fuselage to a free protruding nose of said inlet lip, wherein said nose bounds one side of said inlet opening, an improvement in said air inlet comprising an air guide element that has an aerodynamic contour and that is arranged adjacent to said nose of said inlet lip so as to influence a flow pattern of said outside air that is sucked into said air inlet when said aircraft is operating on the ground, wherein said air guide element has a convexly aerodynamically curved front surface that faces away from said nose of said air inlet lip.

17. In an aircraft including a fuselage, an air suction source that sucks outside air from an atmosphere outside of said aircraft when said aircraft is operating on the ground, and an air inlet having an inlet opening that is flush with or recessed into an outer surface of said fuselage, an air channel that extends and communicates from said inlet opening to said air suction source, and an inlet lip that extends from said fuselage to a free protruding nose of said inlet lip, wherein said nose bounds one side of said inlet opening, an improvement in said air inlet comprising an air guide element that has an aerodynamic contour and that is arranged adjacent to said nose of said inlet lip so as to influence a flow pattern of said outside air that is sucked into said air inlet when said aircraft is operating on the ground, wherein said air guide element is rigidly fixed relative to said nose of said air inlet lip, and a fixed constant air gap is always formed between said air guide element and said nose of said inlet lip.

18. In an aircraft including a fuselage, an air suction source that sucks outside air from an atmosphere outside of said aircraft when said aircraft is operating on the ground, and an air inlet having an inlet opening that is flush with or recessed into an outer surface of said fuselage, an air channel that extends and communicates from said inlet opening to said air suction source, and an inlet lip that extends from said fuselage to a free protruding nose of said inlet lip, wherein said nose bounds one side of said inlet opening, an improvement in said air inlet comprising an air guide element that has an aerodynamic contour and that is arranged adjacent to said nose of said inlet lip so as to influence a flow pattern of said outside air that is sucked into said air inlet when said aircraft is operating on the ground, wherein an outer surface of said inlet lip is a flush extension of said outer surface of said fuselage, an inner surface of said inlet lip extends along and bounds said air channel, said one side of said inlet opening bounded by said nose is a rear side of said opening relative to a forward direction of flight of said aircraft, and said air guide element has a bottom surface that is flush with and does not protrude outwardly beyond said outer surface of said inlet lip.

19. In an aircraft including a fuselage, an air suction source that sucks outside air from an atmosphere outside of said aircraft when said aircraft is operating on the ground, and an air inlet having an inlet opening that is flush with or recessed into an outer surface of said fuselage, an air channel that extends and communicates from said inlet opening to said air suction source, and an inlet lip that extends from said fuselage to a free protruding nose of said inlet lip, wherein said nose bounds one side of said inlet opening, an improvement in said air inlet comprising an air guide element that has an aerodynamic contour and that is arranged adjacent to said nose of said inlet lip so as to influence a flow pattern of said outside air that is sucked into said air inlet when said aircraft is operating on the ground, wherein an outer surface of said inlet lip is a flush extension of said outer surface of said fuselage, an inner surface of said inlet lip extends along and bounds said air channel, and said one side of said inlet opening bounded by said nose is a rear side of said opening relative to a forward direction of flight of said aircraft, and wherein said air guide element is so configured and arranged so that said air guide element redirects a flow pattern of a portion of said outside air that is sucked into said air inlet when said aircraft is operating on the ground so as to prevent the formation of an air separation bubble on said inner surface of said inlet lip in said air channel downstream from said nose of said inlet lip, and so that said air guide element does not protrude outwardly beyond said outer surface of said inlet lip and has no significant influence on a flow pattern of said outside air entering said air inlet when said aircraft is flying in cruise flight.

* * * * *